United States Patent Office 2,876,000
Patented Mar. 3, 1959

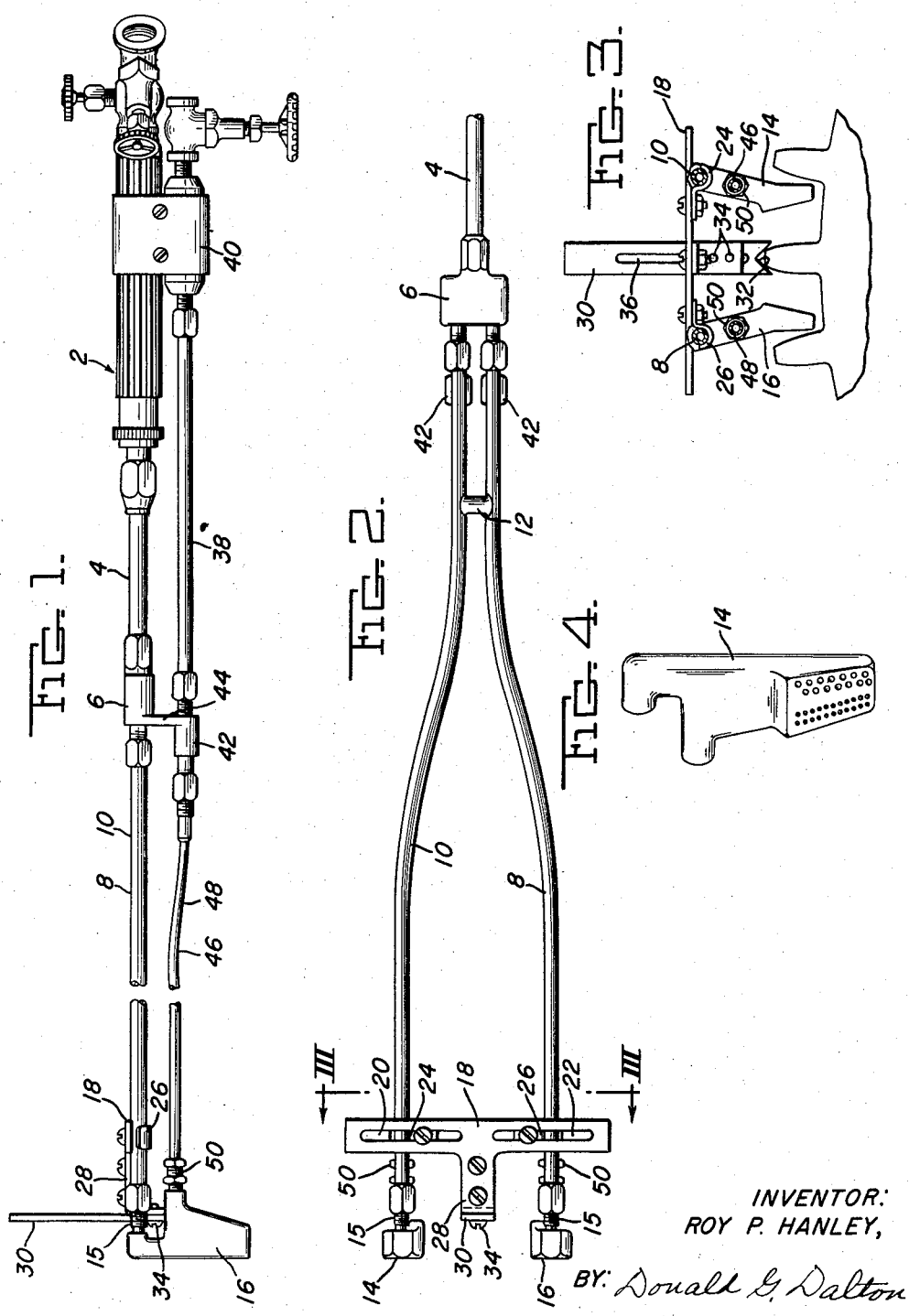

2,876,000

HAND TOOL FOR FLAME-HARDENING GEAR TEETH

Roy P. Hanley, Gary, Ind., assignor to United States Steel Corporation, a corporation of New Jersey Application January 11, 1955, Serial No. 481,219

1 Claim. (Cl. 266—4)

The present invention relates to apparatus for flame-hardening metal and more particularly to a portable flame-hardening device especially suitable for treating gear teeth and the like.

Flame-hardening is a well known method of heat-treating metal and consists of locally heating a steel workpiece above a critical temperature and immediately quenching it to form hardened outer layer or case. Up to the time of my invention apparatus for flame-hardening usually consisted of a permanently located machine having reciprocating nozzle means for sequentially directing a hardening flame and a stream of quenching fluid on to a workpiece sought to be hardened. Apparatus which was designed particularly for flame-hardening gear teeth was ordinarily provided with a pair of spaced nozzles carried by and projected from a reciprocating carriage so as to travel over a hub vise which was adapted to support a gear under the nozzles with the gear teeth in the path of the nozzles.

Prior to my invention, when it was necessary to harden the teeth of a gear, the gear had to be dismantled from the machinery in the mill of which it was a part and then be transported to the site of the flame-hardening machine. It was then placed upon the hub vise and the entire machine adjusted so that the teeth of the gear would be located in the path of the flame hardening nozzles thereof. After the machine was properly adjusted, the carriage of the machine was actuated to cause the flame and quench to travel in a straight path along and straddling one gear tooth. After the nozzles had passed the full length of the gear tooth the gas fuel and the quenching medium were turned off and the nozzle-carriage of the machine was retracted to initial position. Then the gear was rotated so that the next adjacent gear tooth was presented for flame-hardening.

There were many disadvantages inherent in the operation of the type of machine just described, for example, it was necessary to dismantle any gear requiring flame hardening and transport it to the flame-hardening machine before it could be processed. This entailed an undue amount of costly unproductive down-time and expense. Even though prior-art flame-hardening machines were adjustable to accommodate various size gears, there was a limit to the range of gear sizes that could be accommodated by any one machine. No one machine was capable of processing all sizes of gears. Another serious disadvantage inherent in prior machines was the fact that all of them were designed to project the nozzles along a straight line, therefore, the type of gear teeth that could be processed by any one machine was restricted to those extending in a straight line so as to exclude the possibility of using the machine on, for example, a gear having helical teeth.

It is, accordingly, an object of this invention to provide a flame-hardening device which is simple and rugged in construction, inexpensive to manufacture and portable so that it may be manually manipulated to flame-harden workpieces in the field thereby eliminating the necessity of dismantling machines and transporting the parts thereof.

It is a further object of the invention to provide a portable flame-hardening torch which may be easily adjusted to treat a wide range of sizes and shapes of gear teeth.

These and other objects will become more apparent after referring to the following specification and attached drawings, in which:

Figure 1 is a side elevation;
Figure 2 is a partial plan view;
Figure 3 is an end view with parts in section, taken along the plane of line III—III of Figure 2; and
Figure 4 is a perspective view of a duplex nozzle.

Referring more particularly to the drawings, a conventional oxyacetylene torch body 2 has a lead-off pipe 4 in place of the conventional burning tip attached to one end thereof. A Y-shaped fitting 6 is threaded on the end of lead-off pipe 4 and connects two fuel supply pipes 8 and 10 to the lead-off pipe 4. The fuel supply pipes 8 and 10 are spaced apart in parallel relation and are held together by a brace 12 which is spaced a short distance from the fitting 6. The portions of the pipes 8 and 10 extending beyond the brace 12 diverge a short distance and then again become parallel. Conventional duplex flame-hardening nozzles 14 and 16 are threaded onto the free ends of the pipes 8 and 10, respectively. These nozzles have separate fuel and water chambers and outlet ports leading therefrom. The pipes 8 and 10 are connected with the fuel fittings 15 of the nozzles.

A spacer bar 18 is clamped onto the pipes 8 and 10 and extends transversely thereacross at a point rearwardly of the nozzles 14 and 16. The spacer bar is longitudinally slotted as at 20 and 22 to accommodate clamps 24 and 26, respectively, which engage and hold the pipes 8 and 10. The slotted construction of the spacer bar 18 permits adjustment of the space between the nozzles 14 and 16 so that various width gear teeth may be easily accommodated.

The spacer bar 18 is provided with an extension 28 which projects normally from a point intermediate the length thereof and terminates at a point between the nozzles 14 and 16. A guide finger 30, having an inverted V-notch 32 in its lower end, is secured to the extension 28 and projects at right angles thereto. The guide finger 30 is connected to the extension 28 by means of screws 34 inserted through a longitudinal slot 36 in the guide finger and threaded into the extension 28. The screws 34 and the slot 36 in the guide finger 30 permit longitudinal adjustment of the guide finger in a plane parallel to the longitudinal axis of the nozzles 14 and 16. The guide finger 30 serves to ride along the top of the gear tooth being flame-hardened and thereby fix the two nozzles 14 and 16 in proper relation to the surface of the tooth while the device is manipulated along the tooth. The guide finger is adjusted to accommodate gear teeth of various heights by merely loosening the screws 34 and then sliding the guide finger to the desired position.

A water tube 38 disposed below the torch 2 is connected thereto by means of a clamp 40. The water tube 38 extends parallel with the torch 2 and lead-off pipe 4 and has attached to its end a Y-fitting 42 which is located approximately below the Y-fitting 6 and connected therewith by means of a suitable bracket 44. Water supply tubes 46 and 48 extend from the fitting 42 parallel with the gas supply tubes 8 and 10 to the quench-fluid fittings 50 of the nozzles 14 and 16.

In operation, the operator positions the torch so that the notched end of the finger guide 30 rests on the gear tooth to be hardened and then manually moves the torch along the tooth at the proper speed so that the nozzles heat and quench the surface of the tooth properly. The torch is portable and manually manipulated so that it can be used in the field without the necessity of dismantling the gear and transporting it.

While one embodiment of my invention has been shown and described, it will be apparent that other adaptations and modifications may be made without departing from the scope of the following claim.

I claim:

A portable hand tool for flame-hardening a gear tooth which comprises a pair of spaced coplanar fuel supply pipes, a tubular torch body adapted to have fuel gas pass therethrough connected by one end with said pair of fuel supply pipes, a burner nozzle attached to the end of each of said fuel supply pipes remote from said torch body, a rigid unitary spacer bar extending transversely across said pair of fuel supply pipes adjacent said nozzles, said bar having a laterally extending tongue intermediate its ends, a pair of clamps having pipe-engaging portions slidably mounted on said bar each with its pipe-engaging portions projecting from the bar and supporting one of said fuel supply pipes, said clamps each being adjustable along the length of said bar whereby the distance between said pipes is adjustable to space said nozzles a predetermined distance apart, a guide finger adjustably carried by said bar intermediate the ends thereof, said guide finger being disposed on said tongue and extending in a plane normal to the plane of the longitudinal axis of said bar, one end of said finger being adapted to ride along said gear tooth to guide said nozzles therealong, a pair of spaced coplanar quenching fluid supply pipes extending adjacent to and parallel with said pair of fuel supply pipes, a common fluid supply duct attached to one end of said pair of fluid supply pipes, the end of each of said fluid supply pipes remote from said common duct being connected with one of said nozzles, means mounted on said pairs of pipes intermediate the ends thereof connecting said pairs of pipes together, a clamp mounted on said torch body and said common duct connecting the same together, and a gripping surface on the exterior of said torch body whereby said tool may be manipulated by hand to move said nozzles along said gear tooth.

References Cited in the file of this patent

UNITED STATES PATENTS

| | | |
|---|---|---|
| 1,554,408 | Coberly | Sept. 22, 1925 |
| 1,704,473 | Greene | Mar. 5, 1929 |
| 2,067,549 | Sykes | Jan. 12, 1937 |
| 2,125,916 | Halbing | Aug. 9, 1938 |
| 2,181,974 | Kehl | Dec. 5, 1939 |
| 2,188,637 | Walker | Jan. 30, 1940 |
| 2,224,006 | Day | Dec. 3, 1940 |
| 2,279,564 | Emery | Apr. 14, 1942 |
| 2,309,128 | McGuire | Jan. 26, 1943 |
| 2,322,305 | McGuire | June 22, 1943 |

FOREIGN PATENTS

| | | |
|---|---|---|
| 629,490 | France | July 26, 1927 |